United States Patent [19]
Kraay et al.

[11] Patent Number: 5,956,717
[45] Date of Patent: Sep. 21, 1999

[54] DATABASE ORIGAMI

[76] Inventors: Thomas A. Kraay, 15192 Harrison Hill La., Leesburg, Va. 20176-5618; Charles E. Brisbin, 13 Rutherford Cir., Sterling, Va. 20165-6221

[21] Appl. No.: 08/796,922

[22] Filed: Feb. 6, 1997

Related U.S. Application Data

[60] Provisional application No. 60/027,893, Oct. 7, 1996, and provisional application No. 60/036,689, Jan. 31, 1997.

[51] Int. Cl.$^6$ ...................................................... G06F 17/30
[52] U.S. Cl. ............................ 707/10; 707/101; 379/188; 379/189; 395/200.48
[58] Field of Search ..................... 707/10, 101; 379/188, 379/189; 395/200.48

[56] References Cited

U.S. PATENT DOCUMENTS

| | | | |
|---|---|---|---|
| 5,504,810 | 4/1996 | McNair | 379/189 |
| 5,655,013 | 8/1997 | Gainsboro | 379/188 |
| 5,668,988 | 9/1997 | Chen et al. | 707/101 |
| 5,790,665 | 8/1998 | Micali | 380/4 |
| 5,812,670 | 9/1998 | Micali | 380/25 |

*Primary Examiner*—Paul R. Lintz
*Attorney, Agent, or Firm*—Richard B. Main

[57] ABSTRACT

A database tool comprises a computer-implemented method for extracting systematic information from one or more databases that apparently only comprise data noise or seemingly unrelated data items. Criminal and community relationships that exist amongst telephone and internet subscribers are extracted from large telephone databases derived from wire taps and/or long distance telephone records. A telephone records file is used that comprises a caller's telephone number, dialed telephone numbers, and the time. A second database comprises a list of telephone numbers which are suspicious for some reason, and a descriptor as to why each such telephone number is suspicious. A third database includes biographical data about the telephone subscribers, such as name, address, and other facts. The unique telephone numbers in the database are identified. Matches between the first and second databases are made. Related components are grouped into clusters. The valence for each telephone number is computed. The relational distances between each pair of telephone numbers in a cluster are determined. The telephone numbers are represented as points in the x,y-plane of a display, with the distance between the points representing the strength of the relationship based on call frequency and other criteria. An interactive interface is provided for the user to click on items to see the background information associated with each point.

11 Claims, 1 Drawing Sheet

DATABASE ORIGAMI

RELATED APPLICATIONS

This application claims the benefit of two U.S. Provisional Patent Applications, a first being Ser. No. 60/027,893, filed Oct. 7, 1996, titled DATABASE BROWSER, and a second being Ser. No. 60/036,689, filed Jan. 31, 1997, and titled DATABASE ORIGAMI. Such Provisional Applications are incorporated herein by reference.

BACKGROUND OF THE PRESENT INVENTION

1. Field of the Present Invention

The present invention is called DATABASE ORIGAMI because of its ability to unfold and clarify complex, subtle and difficult to uncover relationships and other information hidden in large databases. The present invention relates generally to database browsers and crawlers and more particularly to computer-implemented methods and systems for extracting useful systematic information for law enforcement, the intelligence community, and other organizations with complex analytical requirements from telephone and internet subscriber records, textual, and non-textual databases.

2. Description of Related Art

In 1995, an information management software company, Oracle Corporation, introduced a Microsoft Windows-based software tool designed to help law enforcement investigators more effectively manage and solve cases. Such was marketed as the special investigative unit support system (SIUSS). Information management technology is used to provide insights into criminal activity and reduces the time needed to bring cases to their successful resolution. The Oracle SIUSS collects, stores and analyzes case intelligence information related to complex conspiracies, violent crimes, drug trafficking, and other major cases. The tool combines conventional analytical techniques with job-specific information collection and lead generation analysis. Inputs can be received from various investigative sources, e.g., surveillance teams, forensics experts, wire room operators, citizen tips. The computed conclusions are provided as case leads and made available to agency management, analysts and investigators.

Some prior art law enforcement systems simply gather and store factual information, e.g., names, birthdates, and time of a telephone call. The Oracle SIUSS attempts to develop leads the way investigators do, by starting with known facts and combining them for further insight and leads. SIUSS is based on a conventional relational database management system. Criminal patterns are identified by linking subjects, vehicles, locations, businesses and other entities, within a case or among several cases. Information management is provided to users for investigative intelligence, telephone information, assets, financial data, arrests, seizures, credit card data, surveillance, mail covers, trash pickup and incidents. The telephone information can include toll, pen/DNR, and Title III data. Information can be cross-referenced to uncover otherwise obscure and non-obvious relationships.

Database analysis software is now being used by the Federal Bureau of Investigation (FBI), Immigration and Naturalization Service (INS), Department of Justice (DOJ), US Customs, Alcohol Tobacco and Firearms (ATF), state departments of public safety, and many other agencies at all government levels. Case information can be shared or kept separate to any degree desired, depending on the needs of the investigators. Information bits are gathered from the field in hundreds of bits and pieces at different times and places, and submitted to an automated link analysis. The Oracle SIUSS uses pattern analysis to find information in the timing and sequence of phone calls made by an investigation target. Insights can be developed into how the target and his associates work together in a conspiracy. A conspiracy index is created according to the relationships of calls involving the target and others based on their phone numbers. Such relationships are proportional to their mutual involvement in a conspiracy. Secure databases, networking and encryption technologies are used to control the flow and accessibility of intelligence data outside the supplying agency. An Oracle SIUSS configuration can include a Microsoft WINDOWS operating system hosted on a personal computer, and such can be connected to virtually any type of file server.

The prior art includes many so-called analytical computer programs for law enforcement. Most only store and retrieve data. Others make "analytical" graphics from associations the user must identify first. In general, investigative analysis looks for patterns, associations and profiles, and such information can help steer an investigator to previously unknown criminal activity. Computer programs are now being used to discover in seconds what used to take days using index cards.

Telephone activity analysis involves the identification of illicit operations, and supervisors and their subordinates through telephone profiles. Conventional telephone activity reports display the notes and plant numbers related to each telephone number. If a number occurs in other plant or subject files, which plants and subjects are announced automatically. Financial activity can be combined, sorted and key-word searched for one or more subjects. An account number that appears in another financial plant is also automatically announced. For example, common money laundering methods often display various database indicia. Universal pattern and association searches are conventionally used to combine telephone, surveillance, financial and mail activity, and then to look for any systematic patterns and links. Relational links between a subject, a group, a business, etc., are displayed.

The Institute for Intergovernmental Research (Tallahassee, FL), markets a research specialized software for law enforcement agencies under the name CRIMINAL INTELLIGENCE SYSTEM FOR MICROCOMPUTERS (CIS). Law enforcement agencies are supposed to be able to organize and access information on individual suspects or suspect organizations in an easy to follow format. The CIS program can accept up to seventy-two elements of information on individuals, or forty elements for organizations. CIS groups similar data together for both onscreen viewing and printed reports. Information about individuals is categorized into personal information, alias/moniker, associates, criminal activity, and vehicle information. Organizations are categorized into organization information, criminal activity, and vehicle information. Such organizations can comprise either a business or group suspected of criminal activity. CIS allows access, modifications, additions, and printing of the information. Full or partial descriptions can be entered for most searches, and up to nine elements can be combined to create a personalized search. CIS database records can be transferred between microcomputers, for record sharing within a department or between agencies.

The importance of this invention is that the concept of a map of the datapoints can be extended to other kinds of databases. For example, in a different embodiment of the invention, the files from a seized computer can be datapoints. A metric is defined and the distance between two files is computed. This leads to the construction of the map of datapoints. This concept can also be applied to commercial applications such as transportation, retail sales and marketing.

SUMMARY OF THE PRESENT INVENTION

An object of the present invention is to provide a database tool for extracting systematic information from very large communication connection log databases and business inventory databases.

A further object of the present invention is to provide a database tool that displays relationships between database elements as proportional distances between clickable hypertext points in a two or three dimensional graphic space.

Another object of the present invention is to provide a law enforcement tool for analyzing large databases for obscure relationships amongst database entries.

A still further object of the present invention is to provide an interactive database browser that automatically displays relationships from the point of view of particular database elements, with the closeness of such relationships displayed as proportional distances between clickable hypertext points in a two or three dimensional graphic space.

Briefly, a database tool embodiment of the present invention comprises a computer-implemented method for extracting systematic information from one or more databases that apparently only comprise data noise or seemingly unrelated data items. Criminal and community relationships that exist amongst telephone subscribers are extracted from large telephone databases derived from wire taps and/or long distance telephone records. A telephone records file is used that comprises a caller's telephone number, dialed telephone numbers, and the time and date. A second database comprises a list of telephone numbers which are suspicious for some reason, and a descriptor as to why each such telephone number is suspicious. A third database includes biographical data about the telephone subscribers, such as name, address, and other facts. The unique telephone numbers in the database are identified. Matches between the first and second databases are made. Related components are grouped into clusters. The valence for each telephone number is computed. The relational distances between each pair of telephone numbers in a cluster are determined. The telephone numbers are represented as points in the x,y-plane of a display, with the distance between the points representing the strength of the relationship based on call frequency and other criteria. An interactive interface is provided for the user to click on items to see the background information associated with each point.

An advantage of the present invention is that a database tool is provided that is capable of detecting the evasive techniques used by criminals. Such evasive techniques can include the purchasing of a cellular phone, using it for a week, and then discarding it.

Another advantage of the present invention is a database tool is provided that can quickly extract useful information from exceedingly large databases. This embodiment of the present invention enables the analysis of large databases of textual and non-textual data such as internet messages, reference materials, computer files and a wide variety of other large data systems. A file is created which allows the comparison of documents for similarities in content. Words in whatever language or arbitrary character strings are identified and scored for use in measuring relative distances among data elements. Documents which are most similar are positioned as closely as possible in the map illustrating their relationships.

DETAILED DESCRIPTION OF THE PRESENT INVENTION

Figure 1:
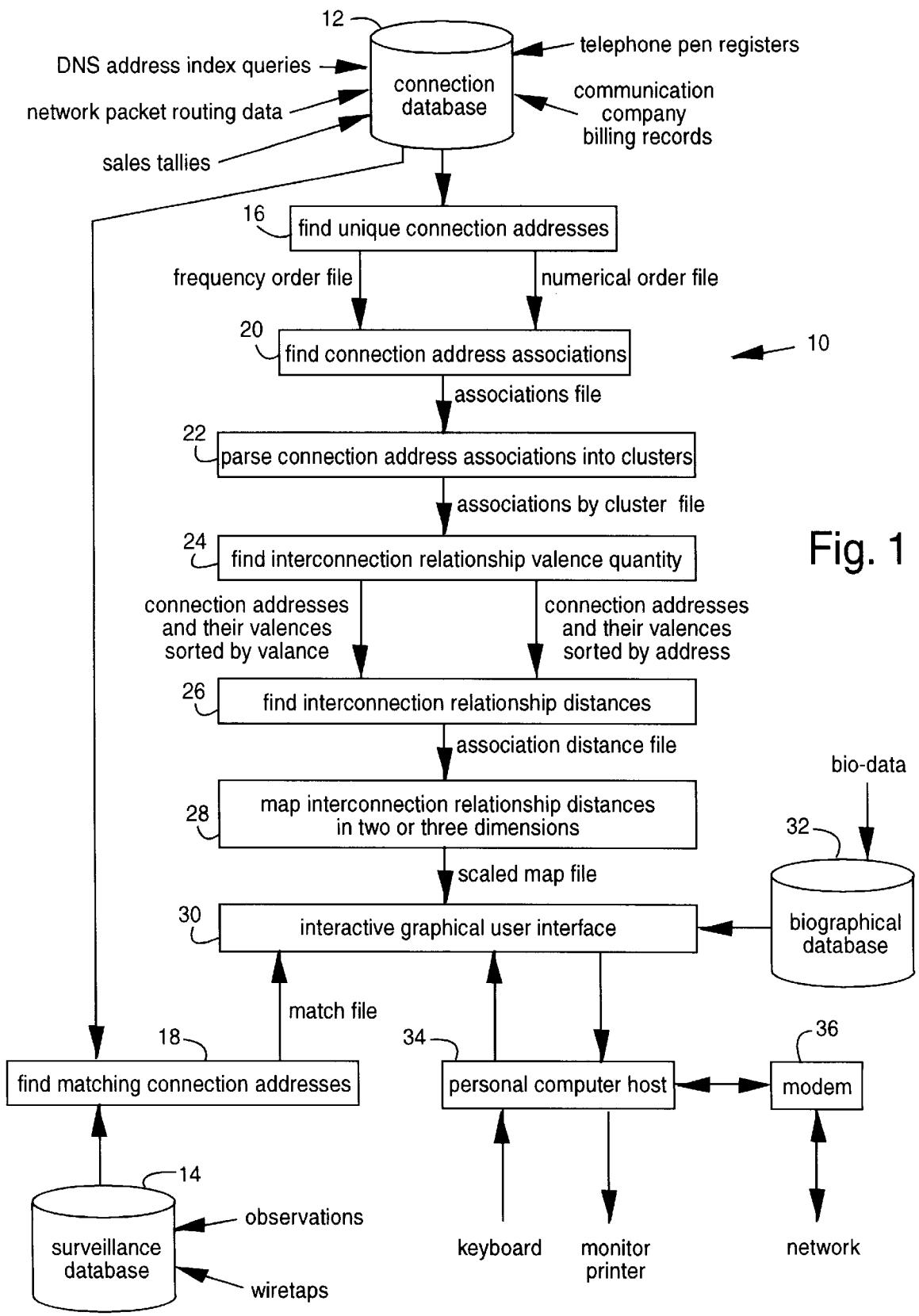
FIG. 1 is a functional block diagram of a database browser embodiment of the present invention.

FIG. 1 represents a database tool embodiment of the present invention, referred to herein by the general reference numeral 10. The database tool 10 comprises a connection database 12, which for example can include connection logs and records of individual communication network subscribers with a corresponding network address. Such communication networks include, but are not limited to, the public switched telephone network (PSTN), the e-mail network, and the internet's world wide web (WWW). The subscriber information obtainable from such networks includes business and residential telephone subscribers' numbers, e-mail account addresses, and TCP/IP internet addresses and packet routing header data. In a prototype embodiment of the present invention, the connection database 12 comprises a disk file, called CHRONO.DAT, for example, and stored telephone call connection records. Each data element in CHRONO.DAT includes caller telephone numbers, callee telephone numbers, and the time and date of the connection between each caller and callee.

A surveillance database 14 includes data entries of network addresses under a user's scrutiny. For example, the surveillance database 14, called SUSPECT.DAT, comprises a list of telephone numbers which are suspicious in nature and a descriptor as to why the telephone number is suspicious.

Embodiments of the present invention may include or be hosted on conventional personal computer (PC) systems and workstation intranets and internets. For example, IBM-compatible PC's with the Microsoft WINDOWS operating system and Apple Computer MACINTOSH computers are particularly useful. In such cases, the preferred embodiments of the present invention will be loaded on such PC's via removable disk media or network downloads. The host operating system and hardware is then used by the embodiments of the present invention for execution, storage, and input/output.

A first computer program 16 is used for identifying each unique communication network subscriber in the database 12. U.S Provisional Patent Application, Ser. No. 60/036,689, filed Jan. 31, 1997, titled DATABASE ORIGAMI, incorporated herein by referene, generates two files of unique sets of telephone numbers contained in the database 12 (CHRONO.DAT). A first of these files, NUMFREQ.DAT for example, comprises the unique telephone numbers sorted in numerical order. It also comprises a count of the number of calls in which that phone number was either the caller or callee, e.g., the frequency. A second file, called FREQORD.DAT for example, comprises the same list of telephone numbers and frequencies, but the data is sorted by frequency.

A second computer program 18 is used for determining each of a plurality of network addresses in the second database of network addresses that are also included in the first database. U.S Provisional Patent Application, Ser. No. 60/036,689, filed Jan. 31, 1997, titled DATABASE ORIGAMI, incorporated herein by referene, compares telephone numbers in the database 14 (SUSPECT.DAT) with those in database 12 (CHRONO.DAT). An output file is constructed, called SUSPECT.VEC for example, and comprises the telephone numbers common to both databases 12 and 14.

A third and fourth computer program 20 and 22 are used for parsing the network addresses into connected component clusters. U.S Provisional Patent Application, Ser. No. 60/036,689, filed Jan. 31, 1997, titled DATABASE ORIGAMI, incorporated herein by referene, finds any associations that exist, e.g., between the telephone numbers, in other words which numbers were connected to what other numbers in the list of telephone numbers. U.S Provisional Patent Application, Ser. No. 60/036,689, filed Jan. 31, 1997, titled DATABASE ORIGAMI, incorporated herein by referene, takes the results of the third computer program 20 (UNIQDBLE), and parses the list of telephone numbers into connected component clusters. Each connection address in a cluster must have evidenced at least one communication connection with at least one other connection address in the same connected component cluster, and to no other connection address in any other connected component cluster. Thus each connection address in a cluster has made at least one connection with a second connection address, and that second connection address has made at least one connection with a third connection address, and so on. All such connected addresses are included in one cluster. Other clusters have no identified intersection with any other cluster.

A fifth computer program 24 is used for computing a valence value for each network address. The valence value represents the total number of other connection addresses with which a particular connection address communicates, either as a caller or a callee. Alternative embodiments of the present invention attach some value to whether the connection address is a caller or a callee. A pair of output files are created by program 24. A first such file is named NUM-VAL.DAT for example, and comprises each telephone number and its valence, sorted in numerical order by telephone number. The second file, named FREQVAL.DAT, has the same data, but is sorted by valence.

A sixth computer program 26 is used for computing a "distance" between any two network addresses that have evidently communicated with each other; in U.S Provisional Patent Application, Ser. No. 60/036,689, filed Jan. 31, 1997, titled DATABASE ORIGAMI, incorporated herein by referene, this program is named COMPDESC. Given M, which is defined as the maximum number of communications between any two telephone numbers in a given cluster, the distance between a telephone number $p_i$ and a telephone number $p_j$ is defined by $$d_{i,j} = \frac{M}{n_{i,j}},$$

where $n_{i,j}$ is the number of times telephone number $p_i$ communicates with telephone number $p_j$. If $n_{i,j}=0$, the distance between telephone number $p_i$ and telephone number $p_j$, is not defined. Therefore, the more $p_i$ and $p_j$ communicate, the shorter will be the "distance" between them. Such measure of "distance" has nothing to do with the real physical geographical distances between telephone subscribers.

A seventh computer program 28, called PLACE in U.S Provisional Patent Application, Ser. No. 60/036,689, filed Jan. 31, 1997, titled DATABASE ORIGAMI, incorporated herein by referene, is used for geometrically mapping the network addresses to points in a mapping space plane or volume relative to the distance computed by the fifth computer program. Each telephone number is mapped into a unique point in an x,y-plane or an x,y,z-volume. Such procedure is computationally intensive, and its particular implementation is critical to the present invention. The preferred mathematics embodied in program 28 or for these calculations are described in U.S Provisional Patent Application, Ser. No. 60/036,689, filed Jan. 31, 1997, titled DATABASE ORIGAMI, incorporated herein by referene.

An interactive interface computer program 30, called DEPICT in U.S Provisional Patent Application, Ser. No. 60/036,689, filed Jan. 31, 1997, titled DATABASE ORIGAMI, incorporated herein by referene. is used for plotting and displaying the mapping plane or volume to a user. The interactive interface 30 provides for a user to be able manipulate each of the connected databases, and the first through seventh computer programs 16–28, in order to extract and present useful information to a user in an easy to grasp format.

A biographical database 32, called MONTBIO.DAT for example, includes biographical data related to the persons or products associated with each connection address in the surveillance database 14.

A personal computer host 34 includes a hard disk data memory storage for large databases and a microprocessor execution unit and support peripherals for downloading and running disk operating systems and software application programs.

A modem 36 provides two-way data communication to other systems via dialed-up telephone lines or TCP/IP internet connection for internet and other networks. Information may be downloaded from or uploaded to data sources and the databases 12, 14, and 32 via the modem 36.

Prior art programs and methods extract useful information from a database of telephone numbers using conventional link analysis to visualize any underlying relationships among the data elements. The present invention avoids the clutter generated by traditional link analysis, and yet achieves its benefits without confusing the user with Byzantine and overwhelming volumes of link line elements. The present invention can detect evasive techniques commonly used by criminals. One such evasion is the purchasing of a cellular phone, using it for a week, and then discarding it. Prior art link analysis has reached a dead end with large databases because the technique leads to an overabundance of links which seriously limits the effectiveness of useful information extraction.

In alternative embodiments of the present invention, the first and second databases 12 and 14 comprise between them at least one of telephone company toll data and dialed-number-recorder (DNR) records, retail and wholesale sales register transaction records, credit card transaction records, internet packet routing data, e-mail routing information, caller-ID data captures, and cellular telephone cell-switching and call-routing information. In general, the information deposited to the first database 12 is voluminous and has a low probability, but not a zero probability, of comprising at least one connection address match with the second database 14. For example, the first database 12 may comprise all the telephone company toll data and dialed-number-recorder records collected by an automatic billing computer for an entire telephone company switching office, area code, country or group of countries.

Another embodiment of the present invention consists of a procedure for extracting useful information from voluminous computer files such as may be obtained from computer seizures by law enforcement agencies, downloaded research files, medical databases, legal research files, news reports, and many others. This embodiment involves an application-specific metric defining a distance between any two files based upon content. Once these distances have been defined, the invention provides a raped procedure for structuring, arranging, and visualizing the relationships among the data sets.

Although particular embodiments of the present invention have been described and illustrated, such is preferably not intended to limit the present invention. Modifications and changes will no doubt become apparent to those skilled in the art, and it is preferably intended that the present invention only be limited by the scope of the appended claims.

The present invention claimed is:

1. A database tool for hosting on a computer with data memory storage for databases and an execution unit for software programs, comprising:

a first database that includes connection logs and records of individual communication-network subscriber with a corresponding communication-network-subscriber address;

a second database of data elements representing communication-network-subscriber addresses under a user's scrutiny;

first means for identifying each unique communication-network-subscriber address in the first database;

second means for determining each of a plurality of communication-network-subscriber addresses in the second database of communication-network-subscriber addresses that are also included in the first database;

third means for parsing said communication-network-subscriber addresses into connected component clusters;

fourth means for computing a valence value for each communication-network-subscriber address;

fifth means for computing a "distance" between any two communication-network-subscriber addresses that have evidently communicated with each other;

sixth means for geometrically mapping said communication-network-subscriber addresses to points in a mapping space plane or volume relative to said distance computed by the fifth means; and seventh means for plotting and displaying said mapping plane or space to a user.

2. The database tool of claim 1, further comprising:

an interactive interface for said user to manipulate each of the first and second databases, and the first through seventh means, in order to extract useful information.

3. The database tool of claim 2, further comprising:

a third database that includes biographical information about persons or products associated with particular connection addresses in the second database and connected to provide such biographical information to the interactive interface for selectively informing said user of previously determined data about each said person or product associated with said particular connection address.

4. The database tool of claim 1, wherein:

the first and second databases comprise between them at least one of telephone company toll data and dialed-number-recorder records, sales register transaction records, credit card transaction records, internet packet routing data, e-mail routing information, caller-ID data captures, and cellular telephone cell-switching and call-routing information.

5. The database tool of claim 1, wherein:

the first means for identifying each unique communication-network-subscriber address in the first database comprises a computer-implemented software program method hosted on a computer that generates two files of unique sets of telephone numbers contained in the first database, a first such file includes said unique telephone numbers sorted in numerical order with a frequency count of the number of calls in which that phone number was either the caller or callee, and a second such file with the same information but the data is sorted by the frequency count.

6. The database tool of claim 1, wherein:

the second means for determining each of a plurality of communication-network-subscriber addresses in the second database of communication-network-subscriber addresses that are also included in the first database comprises a computer-implemented software program method hosted on a computer that compares telephone numbers in the first database with those in the second database, and that outputs a file of the telephone numbers common to both the first and second databases.

7. The database tool of claim 1, wherein:

the third means for parsing said communication-network-subscriber addresses into connected-component clusters comprises a computer-implemented software program method hosted on a computer that finds communication connection associations that exist amongst a plurality of telephone numbers recorded in the first database, wherein each telephone number that was connected to another telephone number at least once is isolated into a single connected-component cluster in which every member of the connected-component cluster can be chained to all of the others by calling-telephone number, called-telephone number, or both.

8. The database tool of claim 1, wherein:

the fourth means for computing a valence value for each communication-network-subscriber address comprises a computer-implemented software program method hosted on a computer that determines the total number of other connection addresses with which a particular connection address communicates, either as a caller or a callee, and that represents the outcome of such determination with a valance value.

9. The database tool of claim 1, wherein:

the fifth means for computing a "distance" between any two communication-network-subscriber addresses that have evidently communicated with each other comprises a computer-implemented software program method hosted on a computer that assigns imaginary relatively scaled distances between points, which represent individual communication addresses in an imaginary plane or space, that are related to the number of times each such communication-network-subscriber addresses have had a communication connection recorded with another represented communication-network-subscriber address according to communication connection information included in the first database.

10. The database tool of claim 1, wherein:

the sixth means for geometrically mapping said communication-network-subscriber addresses includes a host computer with a display monitor or printer for representing a plurality of points, which each represent a single communication-network-subscriber address, in a mapping space plane or volume relative to said distance computed by the fifth means.

11. A database tool, comprising:

a host a computer with data memory storage for databases and an execution unit for software programs;

a first database that includes connection logs and records of individual communication-network-subscriber addresses that includes at least one of telephone company toll data and dialed-number-recorder records, sales register transaction records, credit card transaction records, internet packet routing data, e-mail routing information, caller-ID data captures, and cellular telephone cell-switching and call-routing information;

a second database of data elements representing communication-network-subscriber addresses under a user's scrutiny and that includes at least one of telephone company toll data and dialed-number-recorder records, sales register transaction records, credit card transaction records, internet packet routing data, e-mail routing information, caller-ID data captures, and cellular telephone cell-switching and call-routing information;

first means for identifying each unique communication-network-subscriber address in the first database comprises a computer-implemented software program method hosted on a computer that generates two files of unique sets of telephone numbers contained in the first database, a first such file includes said unique telephone numbers sorted in numerical order with a frequency count of the number of calls in which that phone number was either the caller or callee, and a second such file with the same information but the data is sorted by the frequency count;

second means for determining each of a plurality of communication-network-subscriber addresses in the second database of communication-network-subscriber addresses that are also included in the first database comprises a computer-implemented software program method hosted on a computer that compares telephone numbers in the first database with those in second database, and that outputs a file of the telephone numbers common to both the first and second databases;

third means for parsing said communication-network-subscriber addresses into connected-component clusters comprises a computer-implemented software program method hosted on a computer that finds communication connection associations that exist amongst a plurality of telephone numbers recorded in the first database, wherein each telephone number that was connected to another telephone number at least once is isolated into a single connected-component cluster in which every member of the connected-component cluster can be chained to all of the others by calling-telephone number, called-telephone number, or both;

fourth means for computing a valence value for each communication-network-subscriber address comprises a computer-implemented software program method hosted on a computer that determines the total number of other connection addresses with which a particular connection address communicates, either as a caller or a callee, and that represents the outcome of such determination with a valance value;

fifth means for computing a "distance" between any two communication-network-subscriber addresses that have evidently communicated with each other comprises a computer-implemented software program method hosted on a computer that assigns imaginary relatively scaled distances between points, which represent individual communication addresses in an imaginary plane or space, that are related to the number of times each such communication-network-subscriber addresses have had a communication connection recorded with another represented communication-network-subscriber address according to communication connection information included in the first database;

sixth means for geometrically mapping said communication-network-subscriber addresses includes a host computer with a display monitor or printer for representing a plurality of points, which each represent a single communication-network-subscriber address, in a mapping space plane or volume relative to said distance computed by the fifth means;

seventh means for plotting and displaying said mapping plane or space to a user;

a third database that includes biographical information about persons or products associated with particular connection addresses in the second database and connected to provide such biographical information to the host computer and for selectively informing said user of previously determined data about each said person or product associated with said particular connection address; and an interactive interface included in the host computer providing for a user to manipulate each of the first and second databases, and the first through seventh means, and to extract useful information about relationships that exist between communication-network-subscriber addresses.

* * * * *